(12) United States Patent
Akiyoshi (10) Patent No.: US 12,326,914 B2
(45) Date of Patent: Jun. 10, 2025

(54) COMPUTATION PROCESSING DEVICE, COMPUTATION PROCESSING METHOD, AND CONFIGURATION PROGRAM

(71) Applicant: NEC Platforms, Ltd., Kawasaki (JP)

(72) Inventor: Kenji Akiyoshi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 989 days.

(21) Appl. No.: 17/425,787

(22) PCT Filed: Jan. 15, 2020

(86) PCT No.: PCT/JP2020/001013
§ 371 (c)(1),
(2) Date: Jul. 26, 2021

(87) PCT Pub. No.: WO2020/158384
PCT Pub. Date: Aug. 6, 2020

(65) Prior Publication Data
US 2022/0188378 A1 Jun. 16, 2022

(30) Foreign Application Priority Data
Jan. 30, 2019 (KR) .................. 2019-04327

(51) Int. Cl.
*G06F 17/15* (2006.01)
*G06N 3/0464* (2023.01)

(52) U.S. Cl.
CPC ............ *G06F 17/15* (2013.01); *G06F 17/153* (2013.01); *G06N 3/0464* (2023.01)

(58) Field of Classification Search
CPC ........ G06N 3/04; G06N 3/0464; G06F 17/15; G06F 17/153
See application file for complete search history.

(56) References Cited

U.S. PATENT DOCUMENTS

| 11,501,138 | B1 * | 11/2022 | Duong ................ G06F 9/30098 |
| 2017/0083792 | A1 | 3/2017 | Rodríguez-Serrano et al. |
| 2018/0129935 | A1 * | 5/2018 | Kim ...................... G06F 17/153 |
| 2019/0205780 | A1 * | 7/2019 | Sakaguchi ........... G06V 10/454 |

FOREIGN PATENT DOCUMENTS

| JP | H05108699 A | 4/1993 |
| JP | 2006-186425 A | 7/2006 |
| JP | 2016-004572 A | 1/2016 |

(Continued)

OTHER PUBLICATIONS

Japanese Office Action for JP Application No. 2019-014327 mailed on May 10, 2022 with English Translation.

(Continued)

*Primary Examiner* — Emily E Larocque (57) ABSTRACT

This computation processing device includes: a first computational unit that executes simultaneously-executable convolution computation on data corresponding to no more than a first maximum number of channels of the convolution computation; and a data dividing unit that divides the data which is subject to the convolution computation into data which has no more than the first maximum number of channels when the number of pieces of data which is subject to the convolution computation exceeds the first maximum number of channels.

8 Claims, 6 Drawing Sheets

(56) References Cited

FOREIGN PATENT DOCUMENTS

| | | | |
|---|---|---|---|
| JP | 2016099707 | A | 5/2016 |
| JP | 2017062781 | A | 3/2017 |
| JP | 2017151604 | A | 8/2017 |
| JP | 2018067154 | A | 4/2018 |
| JP | 2018-160086 | A | 10/2018 |

OTHER PUBLICATIONS

International Search Report for PCT Application No. PCT/JP2020/001013, mailed on Feb. 10, 2020.
Japanese Office Action for JP Application No. 2019-014327 mailed on Sep. 29, 2020 with English Translation.
Japanese Office Action for JP Application No. 2019-014327 mailed on May 18, 2021 with English Translation.
Ito Yuki et al., "ooc_cuDNN: A Large-Scale Deep Learning Library Utilizing GPU Computer Memory Layers", IPSJ SIG Technical Report(HPC), Jul. 19, 2017, vol. 2017-HPC-160, No. 38, pp. 1-10, ISSN:2188-8841.
Akanuma Erio et al., "Proposal of a channel-wise parallelization scheme for training of CNN", Information Processing Society of Japan Technical Report, IPSJ, Feb. 21, 2018, vol. 2018-HPC-163, No. 16, pp. 1-7.

* cited by examiner

COMPUTATION PROCESSING DEVICE, COMPUTATION PROCESSING METHOD, AND CONFIGURATION PROGRAM

This application is a National Stage Entry of PCT/JP2020/001013 filed on Jan. 15, 2020, which claims priority from Japanese Patent Application 2019-014327 filed on Jan. 30, 2019, the contents of all of which are incorporated herein by reference, in their entirety.

TECHNICAL FIELD

The present invention relates to a computation processing device, a computation processing method, and a configuration program.

BACKGROUND ART

With the progress of AI (Artificial Intelligence), there is demand for higher-performance computational units that execute convolution computation for realizing AI.

As a related technique, Patent Document 1 discloses a technique related to a device that executes computation processing with the aid of a convolutional neural network.

PRIOR ART DOCUMENTS

Patent Documents

Patent Document 1: Japanese Unexamined Patent Application, Publication No. 2016-099707

SUMMARY OF INVENTION

Problems to be Solved by the Invention

Incidentally, one of method for achieving higher-performance computational units is the miniaturization of a computational unit, and there is demand for a small computational unit capable of executing desired computation processing.

An object of each aspect of the present invention is to provide a computation processing device, a computation processing method, and a configuration program capable of solving the above-described problems.

Means for Solving the Problems

In order to achieve the above-mentioned object, a computation processing device according to one aspect of the present invention includes a first computational unit that executes simultaneously-executable convolution computation on data corresponding to no more than a first maximum number of channels of the convolution computation; and a data dividing unit that divides the data which is subject to the convolution computation into data which has no more than the first maximum number of channels when the number of pieces of data which is subject to the convolution computation exceeds the first maximum number of channels.

In order to achieve the above-mentioned object, the computation processing method according to another aspect of the present invention includes: executing simultaneously-executable convolution computation on data corresponding to no more than a first maximum number of channels of the convolution computation; and dividing the data which is subject to the convolution computation into data which has no more than the first maximum number of channels when the number of pieces of data which is subject to the convolution computation exceeds the first maximum number of channels.

In order to achieve the above-mentioned object, a configuration program according to another aspect of the present invention configures a first computational unit and a data dividing unit as hardware, the first computational unit executing simultaneously-executable convolution computation on data corresponding to no more than a first maximum number of channels of the convolution computation, and the data dividing unit dividing the data which is subject to the convolution computation into data which has no more than the first maximum number of channels when the number of pieces of data which is subject to the convolution computation exceeds the first maximum number of channels.

Advantageous Effects of the Invention

According to each aspect of the present invention, desired computation processing can be realized with a small-scale device.

EXAMPLE EMBODIMENTS

Hereinafter, embodiments will be described in detail with reference to the drawings.

First Embodiment

A computation processing device 1 according to a first embodiment of the present invention is a device that divides a plurality of data channels and performs convolution computation on the sub-divided data. The computation processing device 1 is, for example, a neural network. The computation processing device 1 is configured as hardware such as an ASIC (Application Specific Integrated Circuit), an FPGA (Field Programmable Gate Array), a PLA (Programmable Logic Array), and a PLD (programmable logic device).

Figure 1:
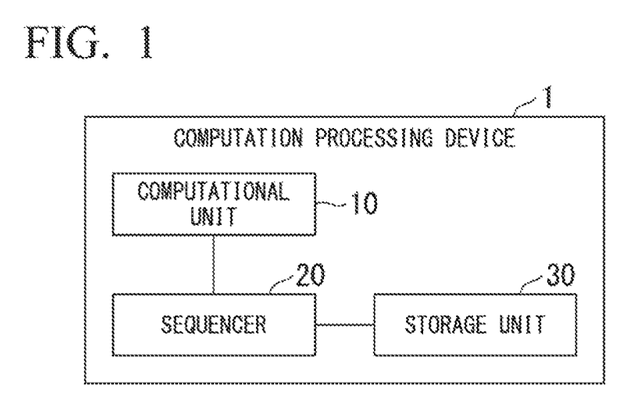
FIG. 1 is a block diagram illustrating a computation processing device according to a first embodiment of the present invention.

As illustrated in FIG. 1, the computation processing device 1 includes a computational unit 10, a sequencer 20, and a storage unit 30.

Figure 2:
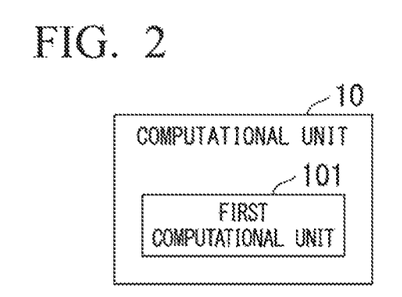
FIG. 2 is a block diagram illustrating a computational unit according to the first embodiment of the present invention.

The computational unit 10 executes convolution computation. As illustrated in FIG. 2, the computational unit 10 includes a first computational unit 101.

The first computational unit 101 executes simultaneously-executable convolution computation on data corresponding to no more than a first maximum number of channels of the convolution computation. For example, the first computational unit 101 may include a computational unit that performs a product-sum operation and executes convolution computation using the computational unit.

Further, the first computational unit 101 includes a computational unit that sums the results of the convolution computation executed for the first maximum number of data channels or less and calculates the total sum of the results of the convolution computation using the computational unit.

Figure 3:
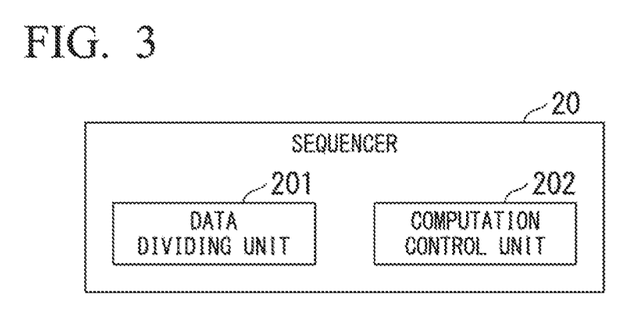
FIG. 3 is a block diagram illustrating a sequencer according to the first embodiment of the present invention.

The sequencer 20 controls the operation performed by the computational unit 10. The content of the processing performed by the computation processing device 1 has already been determined at the design stage. Therefore, the sequencer 20 is designed to cause the computational unit 10 to execute the processing determined at the design stage. As illustrated in FIG. 3, the sequencer 20 includes a data dividing unit 201 and a computation control unit 202 (an example of a first computation control unit).

When the number of pieces of data which is subject to convolution computation and is to be input to the first computational unit 101 exceeds the first maximum number of channels, the data dividing unit 201 divides the data which is subject to the convolution computation into data which has no more than the first maximum number of channels.

Figure 4:
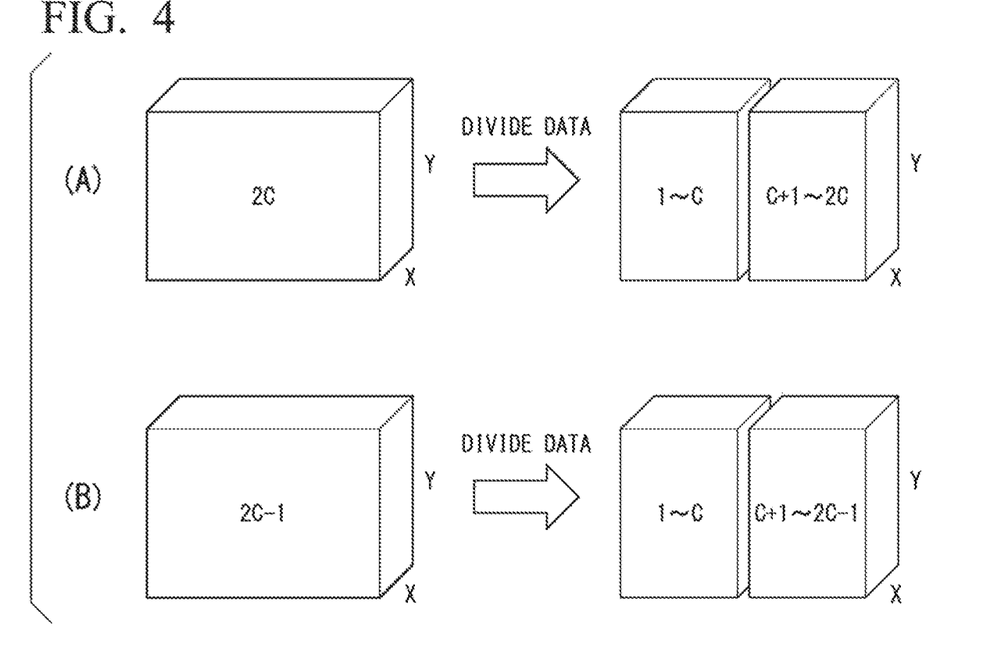
FIG. 4 is a diagram for explaining division of data according to the first embodiment of the present invention.

For example, it may be assumed that the number of pieces of data to be input to the first computational unit 101 is X columns×Y rows×2C channels (note that X is a number representing the number of columns, Y is a number representing the number of rows, and 2C is the number of channels). Further, it is assumed that the first maximum number of channels that can be processed simultaneously by the first computational unit 101 is C (half of 2C). In this case, as illustrated in (A) of FIG. 4, the data dividing unit 201 divides the data input to the first computational unit 101 into two groups of data, that is, X columns×Y rows×C data channels corresponding to the channels 1 to C and X columns×Y rows×C data channels corresponding to the channels (C+1) to 2C.

Further, for example, it is assumed that the number of pieces of data input to the first computational unit 101 is X columns×Y rows×(2C−1) channels. Further, it is assumed that the first maximum number of channels that can be processed simultaneously by the first computational unit 101 is C. In this case, as illustrated in (B) of FIG. 4, the data dividing unit 201 divides the data input to the first computational unit 101 into two groups of data, that is, X columns×Y rows×C data channels corresponding to the channels 1 to C and X columns×Y rows×(C−1) data channels corresponding to the channels (C+1) to (2C−1).

The computation control unit 202 causes the first computational unit 101 to perform convolution computation on the data divided by the data dividing unit 201 into data which has no more than the first maximum number of channels.

For example, the computation control unit 202 inputs the data divided into data which has no more than the first maximum number of channels and the data of a filter prepared in advance to the first computational unit 101. The computation control unit 202 causes the first computational unit 101 to perform a product-sum operation on the input data, whereby convolution computation for each piece of the sub-divided data is realized.

Further, the computation control unit 202 causes the first computational unit 101 to calculate the total sum of the results of the convolution computation. The computation control unit 202 causes the first computational unit 101 to sum all the results of the convolution computation whereby it is possible to calculate the result of the convolution computation for the entire sub-divided data.

The storage unit 30 stores various types of information necessary for the processing performed by the computation processing device 1. For example, the storage unit 30 stores the data of files used when the first computational unit 101 executes the convolution computation.

Next, the operation of the computation processing device 1 will be described.

Here, it is assumed that the data input to the first computational unit 101 at the design stage is divided into the first maximum number of data channels or less. The operation of the computation processing device 1 to obtain the result of the convolution computation for the entire data before division will be described with reference to the processing flow illustrated in FIG. 5.

Figure 5:
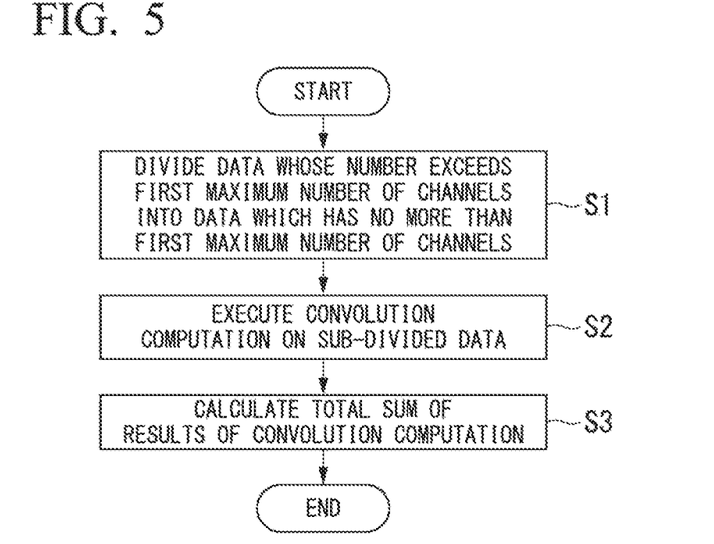
FIG. 5 is a flowchart illustrating processing of a computation processing device according to the first embodiment of the present invention.

In the following description, in order to prevent the explanation of the operation of the computation processing device 1 from becoming complicated, the control by the sequencer 20 is sometimes omitted, and the first computational unit 101 is sometimes expressed as if it is operating independently. However, in such a case, the first computational unit 101 is nevertheless actually controlled by the sequencer 20 such that it performs the processing determined at the design stage.

The data dividing unit 201 divides the data of which the number exceeds the first maximum number of channels, which is subject to the convolution computation input to the first computational unit 101, into the first maximum number of data channels or less (step S1). The data dividing unit 201 writes the sub-divided data in the storage unit 30.

The computation control unit 202 causes the first computational unit 101 to execute convolution computation on the data divided by the data dividing unit 201 into the first maximum number of data channels or less (step S2).

Specifically, the computation control unit 202 inputs the data divided into the first maximum number of data channels or less and the data of the filter prepared in advance to the first computational unit 101. The first computational unit 101 executes a product-sum operation on the input data. As a result, convolution computation is realized for each piece of the sub-divided data.

The computation control unit 202 causes the first computational unit 101 to calculate the total sum of the results of the convolution computation (step S3). The first computational unit 101 sums all the results of the convolution computation. As a result, the result of the convolution computation for the entire sub-divided data can be calculated.

Specific Example of Operation of Computation Processing Device

The content of the processing performed by the computation processing device 1 is determined at the design stage. Further, the number of data channels that can be simultaneously calculated by the first computational unit 101, the number of data channels which is subject to computation processing, and the like are already determined at the design stage. Therefore, here, specific examples of the operation of the computation processing device 1 are illustrated by giving specific numerical values regarding the number of data channels that can be simultaneously calculated by the first computational unit 101 and the number of data channels that are subject to each computation processing. The numerical values illustrated here are examples, and the computation processing device 1 according to the first embodiment of the present invention is not limited to these numerical values.

Here, it is assumed that the computation processing device 1 performs convolution computation corresponding to each of the three layers (first layer, second layer, and third layer), and classifies the data input to the computation processing device 1 into four types of data. In addition, it is assumed that convolution computation for three data channels is executed for the first layer, convolution computation for 16 data channels is executed for the second layer, and convolution computation for 64 data channels is executed for the third layer. Further, it is assumed that the first computational unit 101 includes 32 computational units that perform a product-sum operation and one computational unit that performs summing.

The convolution computation is performed on the three data channels for the first layer to generate the input data of the convolution computation on 16 channels performed for the second layer. Therefore, as the filter used for the convolution computation performed for the first layer, data of 48 (=3×16) types of filters is prepared in advance and written to the storage unit 30.

Further, the convolution computation is performed on the 16 data channels for the second layer to generate the input data of the convolution computation on 64 channels performed for the third layer. Therefore, as the filter used for the convolution computation performed on the second layer, data of 1024 (=16×64) types of filters is prepared in advance and written to the storage unit 30.

Further, the convolution computation is performed on the 64 data channels for the third layer to classify the data input to the computation processing device 1 into four types of data. Therefore, as the filter used for the convolution computation performed on the third layer, data of 256 (=64×4) types of filters is prepared in advance and written to the storage unit 30.

Figure 6:
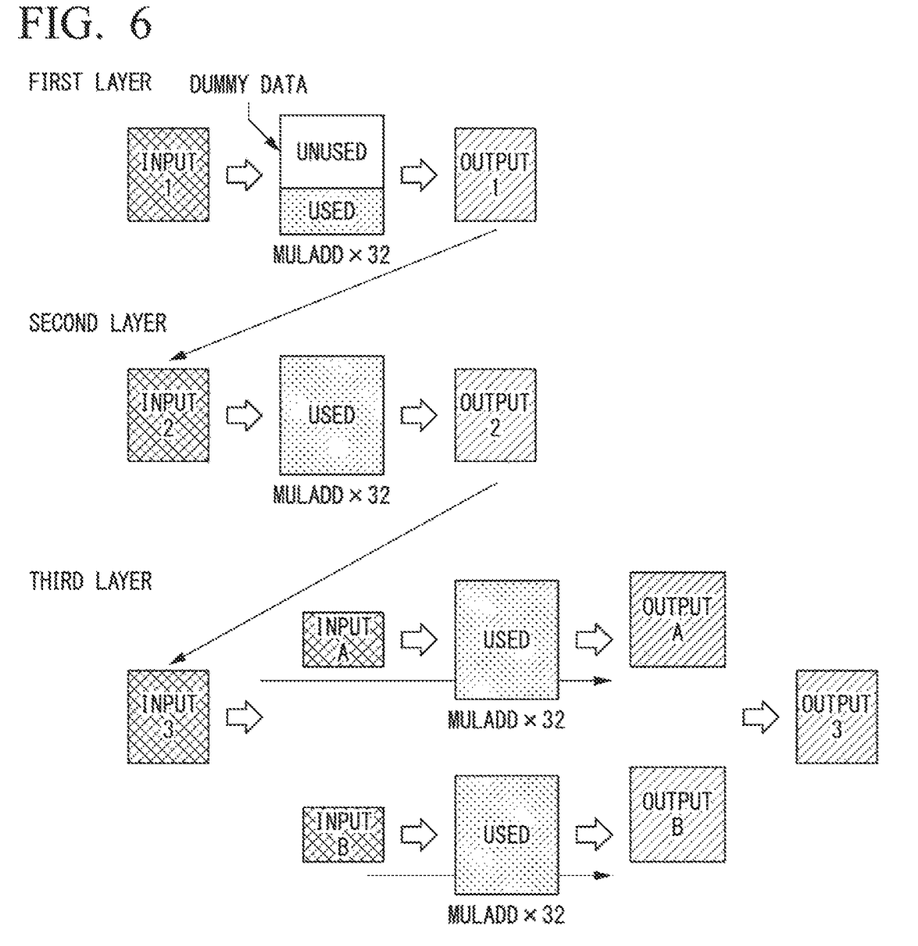
FIG. 6 is a diagram for explaining the operation of the computation processing device according to the first embodiment of the present invention using numerical examples.

FIG. 6 is a diagram illustrating an outline of a data flow in the processing performed by the computation processing device 1. In FIG. 6, the first computational unit 101 is represented by MULADD×32. MULADD is a computational unit that executes a product-sum operation on one data channel Input 1 is the data input to the first computational unit 101 when performing convolution of three data channels. Further, input 2 is the data input to the first computational unit 101 when performing convolution of the 16 data channels. Further, it is the data input to the first computational unit 101 when performing convolution of the 64 data channels.

First, the processing performed by the first computational unit 101 for the first layer will be considered. Here, it is assumed that 32 MULADDs correspond to MULADDs 1 to 32.

MULADD 1 receives, as an input, one of the three data channels and the data of the filter corresponding to the channel. Further, MULADD 2 receives, as an input, another one of the three data channels and the data of the filter corresponding to the channel. Further, MULADD 3 receives, as an input, the remaining one of the three data channels and the data of the filter corresponding to the channel. MULADDs 4 to 32 receive, as an input, dummy data whose output becomes zero. Then, MULADDs 1 to 32 output one calculation result as a whole.

MULADDs 1 to 32 perform the same operation on the data of the remaining filters. That is, MULADDs 1 to 32 output 16 data channels using the data of 48 types of filters. The output data of these 16 channels is the output 1 in FIG. 6.

Next, the processing performed by the first computational unit 101 for the second layer will be considered.

The data itself of output 1 is input to the first computational unit 101. That is, the input 2 is the same as the output 1.

MULADD 1 receives, as an input, one of 16 data channels and the data of the filter corresponding to the channel. Further, MULADD 2 receives, as an input, another one of the data of 16 channels and the data of the filter corresponding to the channel. Similarly, each of MULADD 3 to 16 receives, as an input, another one of the data of 16 channels and the data of the filter corresponding to the channel. Further, MULADDs 17 to 32 receive, as an input, dummy data whose output becomes zero. Then, MULADDs 1 to 32 output one calculation result as a whole.

MULADDs 1 to 32 perform the same operation on the data of the remaining filters. That is, MULADDs 1 to 32 output 64 data channels using 1024 types of filter data. The output data of these 64 channels is the output 2 in FIG. 6.

Next, the processing performed by the first computational unit 101 for the third layer will be considered.

The data itself of the output 2 is input to the first computational unit 101. That is, the input 3 is the same as the output 2. However, the output 2 (that is, the input 3) is 64 data channels. Therefore, the data dividing unit 201 divides 64 data channels into input A and input B, which are 32 data channels.

Then, among the divided inputs A and B, the input A is first input to MULADDs 1 to 32.

MULADD 1 receives, as an input, one of the input data of the input A of the 32 channels and the data of the filter corresponding to the channel. Further, MULADD 2 receives, as an input, another one of the data of the input A of 32 channels and the data of the filter corresponding to the channel. Similarly, each of MULADD 3 to 32 receives, as an input, another one of the data of the input A of the 32 channels and the data of the filter corresponding to the channel. Then, MULADDs 1 to 32 output one calculation result as a whole.

MULADDs 1 to 32 perform the same operation on the data of the remaining filters. That is, MULADDs 1 to 32 output four types of data 1A, 2A, 3A, and 4A using the data of 256 types of filters. These four types of output data are output A in FIG. 6.

Next, among the divided inputs A and B, the input B is input to MULADDs 1 to 32.

MULADD 1 also performs the same processing as the input A for the input B. That is, MULADD 1 receives, as an input, one of the input data of the input B of the 32 channels and the data of the filter corresponding to the channel. Further, MULADD2 receives, as an input, another one of the data of the input B of 32 channels and the data of the filter corresponding to the channel. Similarly, each of MULADD3 to 32 receives, as an input, another one of the data of the input B of the 32 channels and the data of the filter corresponding to the channel. Then, MULADDs 1 to 32 output one calculation result as a whole.

MULADDs 1 to 32 perform the same operation on the data of the remaining filters. That is, MULADDs 1 to 32 output four types of data 1B, 2B, 3B, and 4B corresponding to the pieces of data 1A, 2A, 3A, and 4A using the data of 256 types of filters. These four types of output data are output B in FIG. 6.

Then, the first computational unit 101 calculates the summing of 1A and 1B, the summing of 2A and 2B, the summing of 3A and 3B, and the summing of 4A and 4B, and outputs the output 3 indicating the four calculation results. These four calculation results correspond to the four classifications. Therefore, the computation processing device 1 classifies the data input to the computation processing device 1 into four types of data by outputting the output 3.

The computation processing device 1 according to the first embodiment of the present invention has been described above. In the computation processing device 1, the first computational unit 101 executes the simultaneously-executable convolution computation on data corresponding to no more than the first maximum number of channels of the convolution computation. When the number of pieces of data which is subject to the convolution computation exceeds the first maximum number of channels, the data dividing unit 201 divides the data which is subject to the convolution computation into data which has no more than the first maximum number of channels.

In this way, a plurality of channels of input data is divided with respect to channels, and the convolution computation is performed for the plurality of pieces of divided input data having a decreased data size. By doing so, the computation processing device 1 according to the first embodiment of the present invention can decrease the scale (particularly, of the first computational unit 101) as compared with a computation processing device having a computational unit that performs convolution computation simultaneously on the entire input data.

Second Embodiment

The computation processing device 1 according to the second embodiment of the present invention is a device that divides data of a plurality of channels and performs convolution computation on the sub-divided data. The computation processing device 1 according to the second embodiment of the present invention is configured as hardware such as ASIC, FPGA, PLA, and PLD, similarly to the computation processing device 1 according to the first embodiment of the present invention. However, in the computation processing device 1 according to the first embodiment of the present invention, the calculation result executed by the first computational unit 101 is used as the input of the first computational unit 101 itself. However, the computation processing device 1 according to the second embodiment of the present invention further includes a second computational unit 102 in addition to the first computational unit 101. In this case, a computation control unit 202 (an example of a first computation control unit, an example of a second computation control unit) of the sequencer 20 causes the second computational unit 102 to execute convolution computation using the calculation result executed by the first computational unit 101 as new input data.

The computation processing device 1 includes a computational unit 10, a sequencer 20, and a storage unit 30, similar to the computation processing device 1 according to the first embodiment of the present invention.

Figure 7:
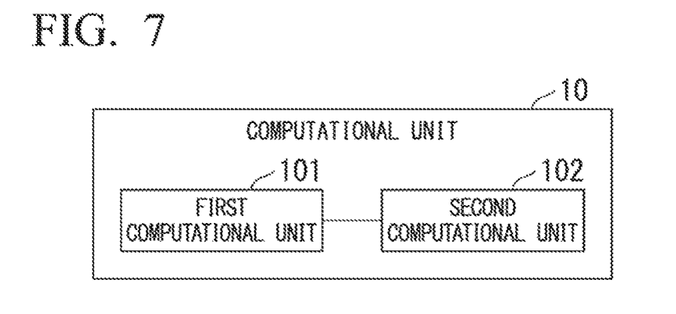
FIG. 7 is a block diagram illustrating a computational unit according to a second embodiment of the present invention.

As illustrated in FIG. 7, the computational unit 10 includes a first computational unit 101 and a second computational unit 102.

The second computational unit 102 executes simultaneously-executable convolution computation on data corresponding to no more than a second maximum number of channels of the convolution computation.

Further, when the number of channels input to the second computational unit 102 exceeds the second maximum number of channels, the data dividing unit 201 divides the data into data which has no more than the second maximum number of channels. Then, the second computational unit 102 executes convolution computation on part or all of the plurality of pieces of data divided into data which has no more than the second maximum number of channels.

When the number of channels input to the second computational unit 102 exceeds the second maximum number of channels, the computation control unit 202 causes the data dividing unit 201 to divide the data into data which has no more than the second maximum number of channels. Further, the computation control unit 202 causes the second computational unit 102 to perform convolution computation on part or all of the plurality of pieces of data divided into data which has no more than the second maximum number of channels.

Further, the computation control unit 202 causes the second computational unit 102 to perform an operation of summing the results of the convolution computation for the plurality of pieces of data divided into data which has no more than the second maximum number of channels.

Hereinafter, a specific example of the operation of the computation processing device 1 in which the second computational unit 102 executes convolution computation on part or all of the plurality of pieces of data divided into data which has no more than the second maximum number of channels will be described.

Specific Example of Operation of Computation Processing Device

As an example, a case in which convolution computation is executed on 3 data channels for the first layer, convolution computation is executed on 16 data channels for the second layer, and convolution computation is executed on 32 data channels for the third layer will be considered.

Figure 8A:
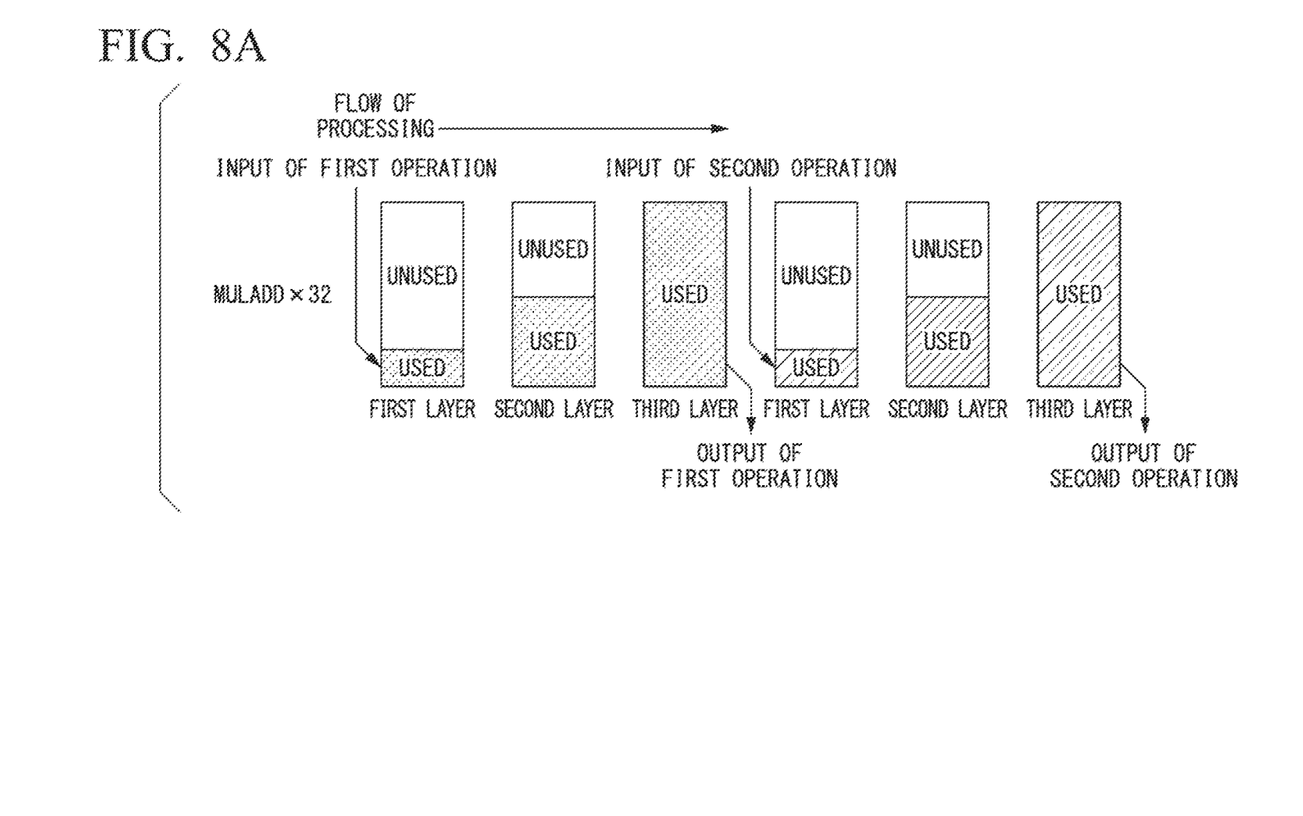
FIG. 8A is a diagram for explaining the operation of the computation processing device according to the first embodiment of the present invention.

When this computation processing is executed by one MULADD, for example, one MULADD×32 composed of MULADDs 1 to 32 as in the computation processing device 1 according to the first embodiment of the present invention, as illustrated in FIG. 8A, there are many unused MULADDs and many useless computational units in the computation processing for the first layer and the second layer, which is executed every time the input data is input.

Therefore, a case where MULADD×16A composed of MULADDs 1 to 16 and MULADD×16B composed of MULADD 17 to 32 execute an operation for an input similar to that of one MULADD×32 will be considered.

Figure 8B:
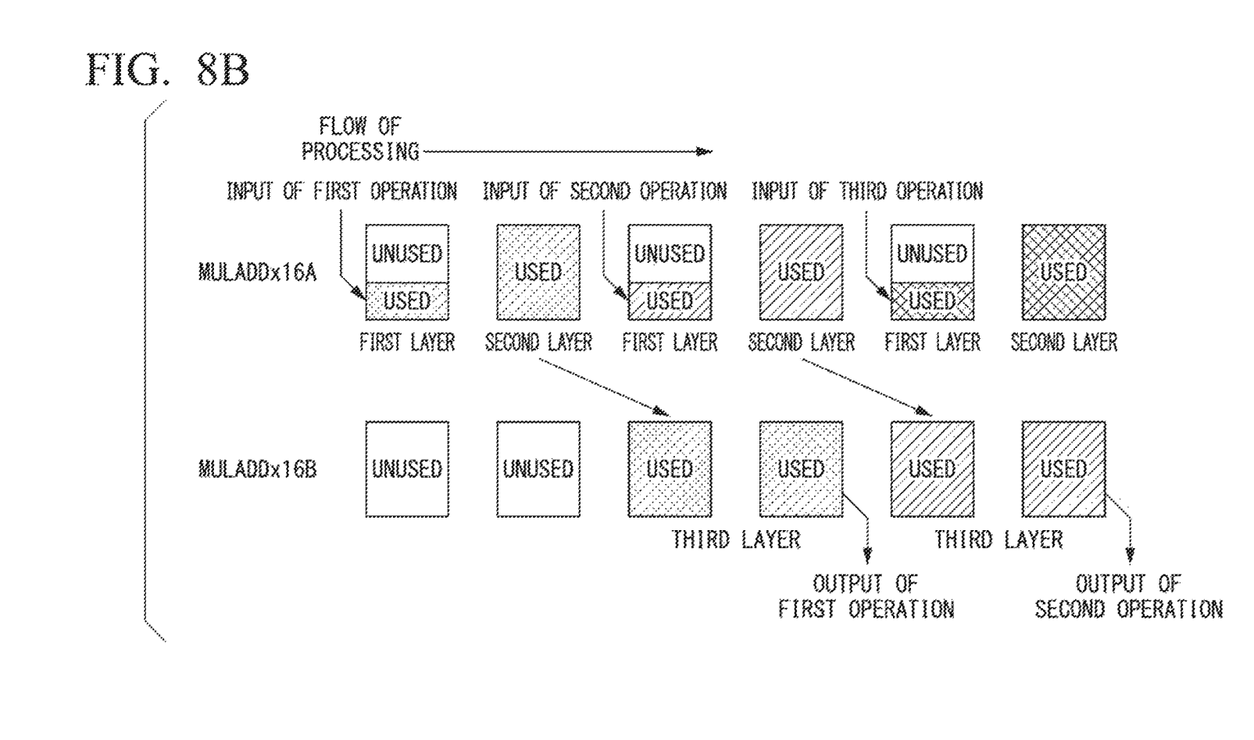
FIG. 8B is a diagram for explaining the operation of the computation processing device according to the second embodiment of the present invention.

Here, it is assumed that the first computational unit 101 is MULADD×16A and the second computational unit 102 is MULADD×16B. Then, it is assumed that the calculation result executed by MULADD×16A is input to MULADD×16B as new input data. In this case, different processes can be executed simultaneously as in the pipeline method as illustrated in FIG. 8B using MULADD×16A and MULADD×16B by taking the timing of computation processing into consideration.

That is, the computation control unit 202 of the sequencer 20 can efficiently execute the computation processing by causing the second computational unit 102 to execute the convolution computation using the calculation result executed by the first computational unit 101 as new input data.

The computation processing device 1 according to the second embodiment of the present invention has been described above. In the computation processing device 1, the second computational unit 102 executes the simultaneously-executable convolution computation on data corresponding to no more than the second maximum number of channels of the convolution computation. Further, when the number of channels of the input data exceeds the second maximum number of channels, the second computational unit 102 executes the convolution computation on part or all of the plurality of piece of data divided into data which has no more than the second maximum number of channels by the data dividing unit 201. Further, the computation control unit 202 causes the second computational unit 102 to execute convolution computation on the plurality of pieces of data divided into data which has no more than the second maximum number of channels. Further, the computation control unit 202 causes the second computational unit 102 to perform an operation of summing the results of the convolution computation on the plurality of pieces of data divided into data which has no more than the second maximum number of channels.

In this way, the second computational unit 102 executes the convolution computation for part or all of the plurality of pieces of data divided into data which has no more than the second maximum number of channels. By doing so, the computation processing device 1 according to the second embodiment of the present invention can improve the efficiency of computation processing as compared with a case in which only one computational unit (for example, the first computational unit 101) executes the computation processing, and only one computational unit executes computation processing using the calculation result of the computation processing as a new input again.

Next, the computation processing device 1 having the minimum configuration according to the embodiment of the present invention will be described.

Figure 9:
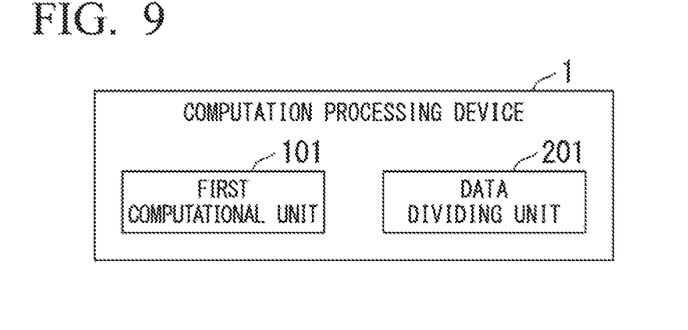
FIG. 9 is a block diagram illustrating a computation processing device with a minimum configuration according to an embodiment of the present invention.

As illustrated in FIG. 9, the computation processing device 1 having the minimum configuration according to the embodiment of the present invention includes a first computational unit 101 and a data dividing unit 201.

The first computational unit 101 executes simultaneously-executable convolution computation on data corresponding to no more than the first maximum number of channels of the convolution computation.

When the number of pieces of data which is subject to the convolution computation exceeds the first maximum number of channels, the data dividing unit 201 divides the data which is subject to the convolution computation into data which has no more than the first maximum number of channels.

In this way, a plurality of channels of input data is divided with respect to channels, and the convolution computation is performed for the plurality of pieces of divided input data having a decreased data size. By doing so, the computation processing device 1 according to the embodiment of the present invention can decrease the scale (particularly, of the first computational unit 101) as compared with a computation processing device having a computational unit that performs convolution computation simultaneously on the entire input data.

In another embodiment of the present invention, the sequencer 20 may access the storage unit 30 using a DMA (Direct Memory Access) technology.

Figure 10:
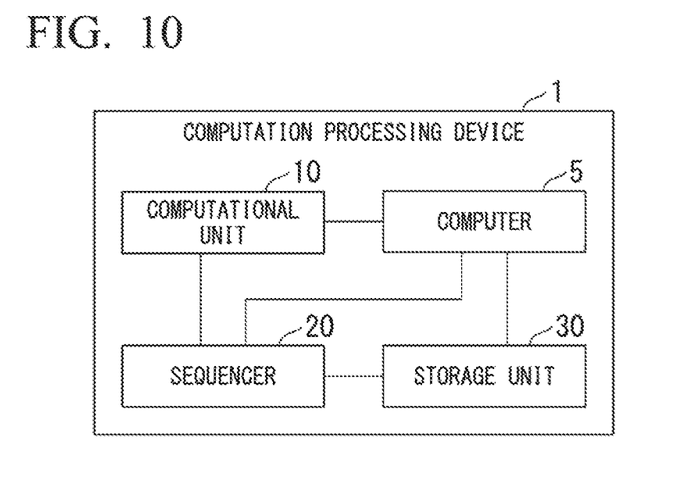
FIG. 10 is a block diagram illustrating a computation processing device according to another embodiment of the present invention.

In another embodiment of the present invention, the computation processing device 1 may include a computer 5 as illustrated in FIG. 10. In this case, the computer 5 may execute part of the processing instead of the computational unit 10 and the sequencer 20.

For example, the computer 5 may perform an operation of summing the calculation results of the divided inputs A and B in the first embodiment of the present invention instead of the first computational unit 101.

In the processing according to the embodiment of the present invention, the order of the processing may be changed within a range where the appropriate processing is performed.

Each of the storage unit 30 and the other storage devices according to the embodiment of the present invention may be provided anywhere within a range in which appropriate information is transmitted and received. Further, each of the storage unit 30 and the other storage devices according to the embodiment of the present invention may be present in a plurality of storage units within a range in which appropriate information is transmitted and received, and may store data in a distributed manner.

Although the embodiment of the present invention has been described, the above-mentioned computation processing device 1 and other control devices may have a computer system therein. The process of the above-mentioned processing is stored in a computer-readable recording medium in the form of a program, and the above-mentioned processing is performed by a computer reading and executing this program. A specific example of a computer is illustrated below.

Figure 11:
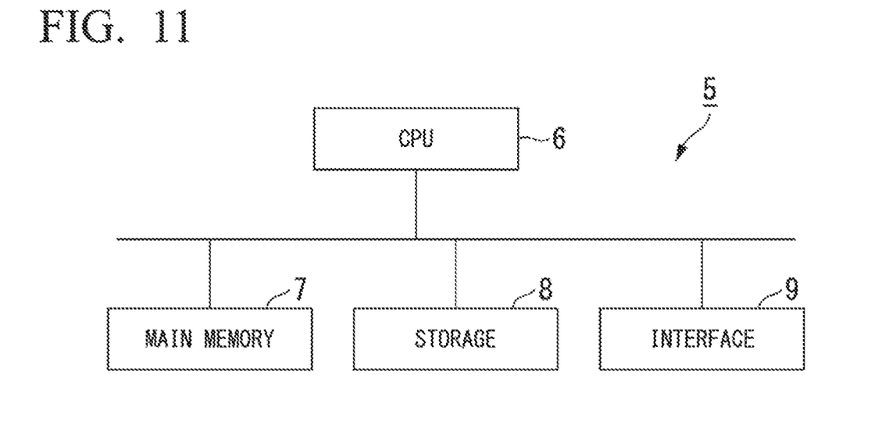
FIG. 11 is a block diagram illustrating a configuration of a computer according to at least one embodiment.

FIG. 11 is a schematic block diagram illustrating the configuration of a computer according to at least one embodiment.

As illustrated in FIG. 11, the computer 5 includes a CPU 6, a main memory 7, a storage 8, and an interface 9.

For example, each of the above-mentioned computation processing device 1 and other control devices is mounted on the computer 5. The operation of each processing unit described above is stored in the storage 8 in the form of a program. The CPU 6 reads a program from the storage 8, deploys the program into the main memory 7, and executes the above-mentioned processing according to the program. Further, the CPU 6 secures a storage area corresponding to each of the storage units in the main memory 7 according to the program.

Examples of the storage 8 include an HDD (Hard Disk Drive), an SSD (Solid State Drive), a magnetic disk, an optical magnetic disk, a CD-ROM (Compact Disc Read Only Memory), a DVD-ROM (Digital Versatile Disc Read Only Memory), a semiconductor memory, and the like. The storage 8 may be an internal medium directly connected to the bus of the computer 5, or an external medium connected to the computer 5 via an interface 9 or a communication line. When this program is distributed to the computer 5 via a communication line, the distribution destination computer 5 may deploy the program in the main memory 7 and execute the above-mentioned processing. In at least one embodiment, the storage 8 is a non-transitory tangible storage medium.

Further, the above-mentioned program may realize part of the above-mentioned functions. Further, the program may be a file that can realize the above-mentioned functions in combination with a program already recorded in the computer system, that is, a so-called differential file (differential program).

Although some embodiments of the present invention have been described, these embodiments are examples and do not limit the scope of the invention. Various additions, omissions, replacements, and changes may be made to these embodiments without departing from the gist of the invention.

Some or all of the above-mentioned embodiments of the present invention may also be described as, but not limited to, the following supplementary notes.

[Supplementary Note 1]

A computation processing device comprising: a first computational unit that executes simultaneously-executable convolution computation on data corresponding to no more than a first maximum number of channels the convolution computation; and a data dividing unit that divides the data which is subject to the convolution computation into data which has no more than the first maximum number of channels when the number of pieces of data which is subject to the convolution computation exceeds the first maximum number of channels.

[Supplementary Note 2]

The computation processing device according to Supplementary Note 1, further comprising a first computation control unit that causes the first computational unit to execute the convolution computation on the data divided into data which has no more than the first maximum number of channels.

[Supplementary Note 3]

The computation processing device according to Supplementary Note 2, wherein the first computation control unit causes the first computational unit to perform an operation of summing the result of the convolution computation on the data divided into data which has no more than the first maximum number of channels.

[Supplementary Note 4]

The computation processing device according to any one of Supplementary Notes 1 to 3, further comprising a second computational unit that executes simultaneously-executable convolution computation on data corresponding to no more than a second maximum number of channels of the convolution computation, the second computational unit executes the convolution computation on part or all of the data divided into data which has no more than the second maximum number of channels by the data dividing unit when the number of channels of input data exceeds the second maximum number of channels.

[Supplementary Note 5]

The computation processing device according to Supplementary Note 4, further comprising a second computation control unit that causes the second computational unit to execute the convolution computation on the data divided into data which has no more than the second maximum number of channels.

[Supplementary Note 6]

The computation processing device according to Supplementary Note 5, wherein the second computation control unit causes the second computational unit to perform an operation of summing the result of the convolution computation on the data divided into data which has no more than the second maximum number of channels.

[Supplementary Note 7]

The computation processing device according to any one of Supplementary Notes 1 to 6, wherein the first computational unit is configured as hardware.

[Supplementary Note 8]

The computation processing device according to Supplementary Note 7, wherein the hardware is an ASIC, an FPGA, a PLA or a PLD.

[Supplementary Note 9]

A computation processing method comprising: executing simultaneously-executable convolution computation on data corresponding to no more than a first maximum number of channels of the convolution computation; and dividing the data which is subject to the convolution computation into data which has no more than the first maximum number of channels when the number of pieces of data which is subject to the convolution computation exceeds the first maximum number of channels.

[Supplementary Note 10]

A configuration program that configures a first computational unit and a data dividing unit as hardware, the first computational unit executing simultaneously-executable convolution computation on data corresponding to no more than a first maximum number of channels the convolution computation, and the data dividing unit dividing the data which is subject to the convolution computation into data which has no more than the first maximum number of channels when the number of pieces of data which is subject to the convolution computation exceeds the first maximum number of channels.

[Supplementary Note 11]

A recording medium having a program recorded thereon, the program causing a computer to execute at least one of:

executing simultaneously-executable convolution computation on data corresponding to no more than a first maximum number of channels of the convolution computation; and dividing the data which is subject to the convolution computation into data which has no more than the first maximum number of channels when the number of pieces of data which is subject to the convolution computation exceeds the first maximum number of channels.

This application claims priority to and the benefit from Japanese Patent Application No. 2019-14327, filed on Jan. 30, 2019, the contents of which are hereby incorporated by reference into the present application.

INDUSTRIAL APPLICABILITY

The present invention can be used for a computational unit that executes convolution computation, and can realize desired computation processing with a small-scale device.

REFERENCE SIGNS LIST

1 Computation processing device
5 Computer
6 CPU
7 Main memory
8 Storage
9 Interface
10 Computational unit
20 Sequencer
30 Storage unit 101 First computational unit
102 Second computational unit
201 Data dividing unit
202 Computation control unit

What is claimed is:

1. A computation processing device comprising:
a memory storing computer program instructions; and
at least one processor connected to the memory and configured to execute the computer program instructions to:
execute first simultaneously-executable convolution computation on data corresponding to no more than a first maximum number of channels of the first simultaneously-executable convolution computation; and
divide the data which is subject to the first simultaneously-executable convolution computation into data which has no more than the first maximum number of channels when the number of pieces of data which is subject to the first simultaneously-executable convolution computation exceeds the first maximum number of channels.

2. The computation processing device according to claim 1, wherein the at least one processor is configured to execute the computer program instructions to execute the first simultaneously-executable convolution computation on the data divided into data which has no more than the first maximum number of channels.

3. The computation processing device according to claim 2, wherein the at least one processor is configured to execute the instructions to perform an operation of summing the result of the first simultaneously-executable convolution computation on the data divided into data which has no more than the first maximum number of channels.

4. The computation processing device according to claim 1, wherein the at least one processor is configured to execute the computer program instructions to execute a second simultaneously-executable convolution computation on data corresponding to no more than a second maximum number of channels of the second simultaneously-executable convolution computation, and execute the second simultaneously-executable convolution computation on part or all of the data divided into data which has no more than the second maximum number of channels by the data dividing unit when the number of channels of input data exceeds the second maximum number of channels.

5. The computation processing device according to claim 4, wherein the at least one processor is configured to execute the computer program instructions to execute the second simultaneously-executable convolution computation on the data divided into data which has no more than the second maximum number of channels.

6. The computation processing device according to claim 5, wherein the at least one processor is configured to execute the computer program instructions to perform an operation of summing the results of the second simultaneously-executable convolution computation on the data divided into data which has no more than the second maximum number of data channels or less.

7. A computation processing method performed by a computer and comprising:
executing simultaneously-executable convolution computation on data corresponding to no more than a first maximum number of channels of the simultaneously-executable convolution computation; and
dividing the data which is subject to the simultaneously-executable convolution computation into data which has no more than the first maximum number of channels when the number of pieces of data which is subject to the simultaneously-executable convolution computation exceeds the first maximum number of channels.

8. A non-transitory recording medium storing a program executable by a computer to perform processing comprising:
executing simultaneously-executable convolution computation on data corresponding to no more than a first maximum number of channels of the simultaneously-executable convolution computation; and
dividing the data which is subject to the simultaneously-executable convolution computation into data which has no more than the first maximum number of channels when the number of pieces of data which is subject to the simultaneously-executable convolution computation exceeds the first maximum number of channels.

* * * * *